United States Patent [19]

Kramer

[11] Patent Number: 4,482,592
[45] Date of Patent: Nov. 13, 1984

[54] VIBRATION ISOLATION PAD

[75] Inventor: James H. Kramer, Akron, Ohio

[73] Assignee: The B. F. Goodrich Company, New York, N.Y.

[21] Appl. No.: 528,821

[22] Filed: Sep. 2, 1983

Related U.S. Application Data

[62] Division of Ser. No. 237,232, Feb. 23, 1981, Pat. No. 4,436,274.

[51] Int. Cl.³ .............................................. F16M 1/00
[52] U.S. Cl. ....................................... 428/67; 428/78; 428/172; 428/195; 428/909
[58] Field of Search .................. 428/78, 172, 909, 67, 428/195

[56] References Cited

U.S. PATENT DOCUMENTS

| 2,911,318 | 11/1959 | Lerch | 428/67 |
| 3,650,874 | 3/1972 | Job et al. | 428/262 |
| 4,050,756 | 9/1977 | Moore | 428/133 |
| 4,315,048 | 2/1982 | Beghelli et al. | 428/78 |
| 4,436,274 | 3/1984 | Kramer | 248/633 |

Primary Examiner—James C. Cannon
Attorney, Agent, or Firm—Joseph Januszkiewicz

[57] ABSTRACT

A laminated vibration isolation pad comprising first or top rigid layer of ultra-high molecular weight polyethylene material, a second layer of vulcanized elastomeric material with an additional third or bottom layer of spaced resilient vulcanized elastomeric projections. The laminated vibration isolation pad is fabricated as a unitary structure with the polyethylene layer bonded or fused to the rubber layer while being formed.

5 Claims, 5 Drawing Figures

VIBRATION ISOLATION PAD

This is a division of application Ser. No. 237,232 filed Feb. 23, 1981, now U.S. Pat. No. 4,436,274.

BACKGROUND OF THE INVENTION

The present invention relates to a vibration isolation pad which may be made in sections to facilitate its installation in building floors to provide an effective means for reducing sound transmission and for eliminating vibration.

In the effort to reduce sound and vibration transmission through buildings efforts have been made to locate the noise producing equipment as far as possible from those areas that are sought to be free from noise and vibration effects, however, because it has been sought to reduce weight loads in buildings, noise and vibration transmission has become more of a problem as newer structural construction members have become lighter in weight and longer in dimensions which effectively increases the noise level problems.

The present invention effectively reduces the sound transmission between noisy and quiet areas since the vibration isolation pad can be made to directly support the machine or apparatus producing the noise as part of the structure thereby facilitating its sound deadening and noise absorbing characteristics immediately at the source or the vibration isolation pad can be made to directly isolate the entire base support of a noise and vibration producing means to indirectly support such noise producing means and thereby also eliminate the noise and vibration at the source. The vibration isolation pad thus operates directly in the effected area permitting greater flexibility in locating machinery in buildings and manufacturing facilities. Such vibration isolation pads are substantially superior over those sound deadening means which are resilient pad mounted directly to or under the machines. The invention herein permits the installation and use of vibration isolation pad over a large area of support, followed by the installation of a floor, a base support or a concrete pad directly on the vibration isolation pad to thereby effectively isolate the base support but provide a firm base.

Because the vibration isolation pad is a composite of plastic and rubber, it may be readily cut or fabricated in various shapes, contours and sizes in order to be useful in wide varieties of structures. Also the vibration isolation pads are lightweight for easy installation and safe handling.

SUMMARY OF THE INVENTION

The present invention contemplates an isolation pad having an upper layer made of an ultra-high molecular weight polyethylene with a lower layer of elastomeric material bonded thereto. A plurality of laterally and longitudinally spaced projections are molded directly to the lower layer presenting attenuation means. Such pads may be selectively positioned in adjacent relationship with the entire area of pads supporting a concrete pad that forms the base for a machine.

DETAILED DESCRIPTION

Figure 1:
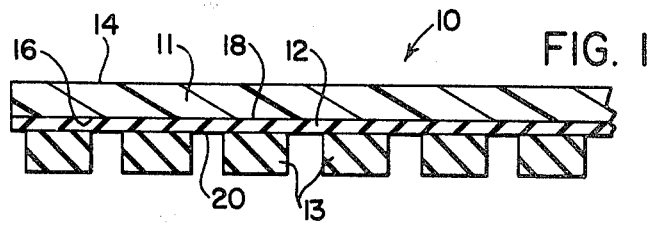
FIG. 1 is a side elevational view of a vibration isolation pad taken in cross-section in accordance with a preferred embodiment of this invention.
Figure 2:
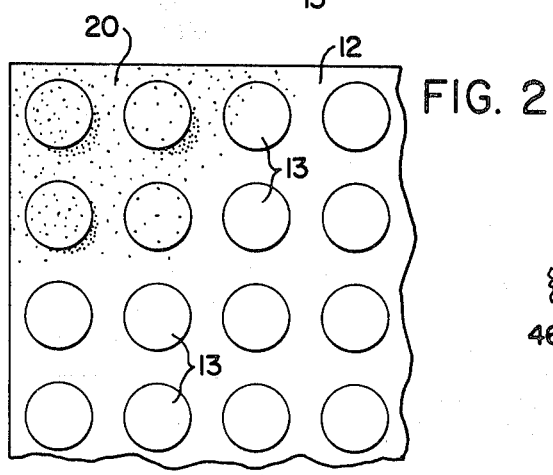
FIG. 2 is a plan view of the vibration isolation pad shown in FIG. 1.

Referring to the drawings, wherein like reference numerals designate like or corresponding parts throughout the several views, there is shown in FIG. 1 a substantially rectangularly shaped and essentially flat composite isolation pad 10. It is to be understood, however, that the shape of the isolation pad can be made in a variety of shapes and contours. The vibration isolation pad 10 may be made in any desired shape other than rectangular depending on requirements of its intended use.

The composite vibration isolation pad 10 is a laminated member comprising a rigid first or outer ultra-high molecular weight polyethylene layer 11, a resilient second elastomeric layer 12 and integrally attached to the second layer 12 a plurality of laterally and longitudinally spaced resilient elastomeric projections or members 13 which may be considered a third layer. Preferably, the relative thicknesses of each layer 11, 12 and 13 vary from the first to the third layer, such that the elastomeric layer 12 is the thinnest of the three layers while the third layer 13 is the thickest of the three layers to provide for a greater attenuation of sound and vibration. The laminated composite isolation pad 10 is shown as having the respective resilient members 13 as cylindrical, however, the members 13 may be square of some other configuration.

The first layer or outer layer 11 has an outer surface 14 and an inner surface 16 which are substantially parallel. Such first layer is composed of an ultra-high molecular weight polyethylene which has a melt flow index as to have a melt flow index less than 0.15 measured in accordance with the test procedure of ASTM 1238-65T modified by an additional 3 kilogram load (U.S. Pat. No. 3,650,874). Such use of the ultra-high molecular weight polyethylene for the outer layer 11 permits either in-site type bonding or fusing to occur with the second elastomeric layer 12 or have these pads prepared prior to their installation as of the shelf pads.

The second layer 12 has an inner surface 18 and an outer surface 20 which are substantially parallel. Inner surface 18 abuttingly contacts surface 16 of the first layer 11. Such second layer 12 and the projections 13 are composed of a resilient, vulcanized elastomeric material having good abrasion, corrosion and impact resistant properties. Examples of elastomeric materials having such properties and which could be used as layer 12 material or projections 13 are blends of cis polybutadiene rubber and styrene butadiene or natural rubber where the proportion of the cis polybutadiene component of such blend is varied according to the particular environment in which the pad as used. When vulcanized such elastomeric materials with the plurality of spaced projections 13 exhibits exceptional ability to dampen sound and vibration.

Figure 4:
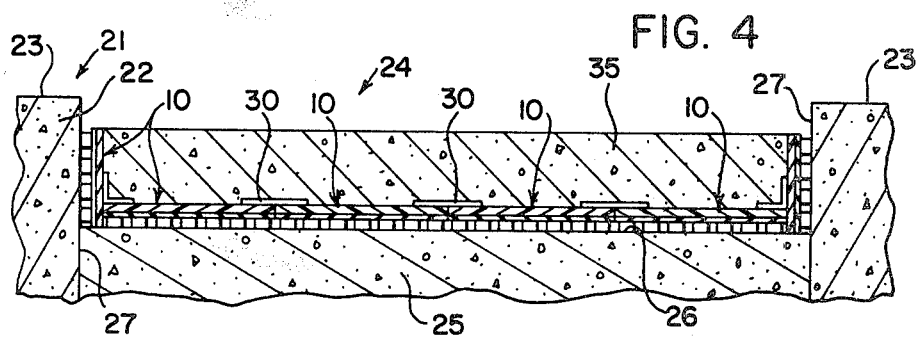
FIG. 4 is a side elevational view of a portion of a plurality of vibration isolation pad supporting a concrete pad that support a machine or apparatus.
Figure 5:
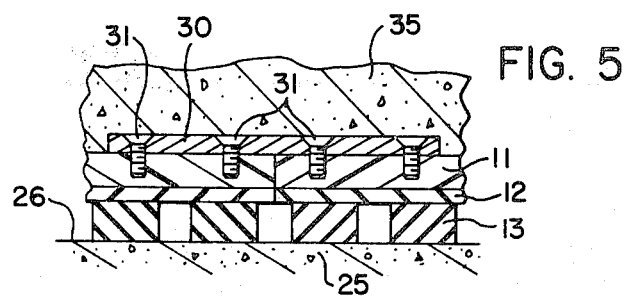
FIG. 5 is an enlarged view of a portion of the juncture of two vibration isolation pads illustrated in FIG. 4.

The isolation pads 10 are shown in FIG. 4 as located in a pit or depression 24 of a factory floor designated as 21, which floor 21 is substantially a continuous concrete layer 22 having a surface 23. The floor 21 is shown as having the depression or pit 24 with a separate concrete pad 25. Concrete pad 25 has an upper surface 26 that extends to the side surfaces or vertical walls 27 of the pit 24. Such pit 24 is shown as composed of a separate section of concrete although it can be one continuous concrete pad. Located within the pit 24 and on the surface 26 in abutting contact therewith are the plurality of pads 10. The respective resilient cylindrical projections or members 13 of pads 10 rest on the surface 26. Adjacent pads 10 are suitably interconnected by plates 30 which are recessed to receive a plurality of screws 31 that are imbedded into the ultra-high molecular weight layer 12. Positioned against the vertically extending sidewall surfaces 27 of pit 24 are a plurality of composite isolation pads 10. A concrete pad 35 is poured into the pit to provide a base support or pad for a machine or apparatus. The thickness of the concrete pad or base 35 is determined by the weight of the machine desired to be supported. This design is particularly useful in environments where a machine transmits vibrations to surrounding areas as the machine is effectively isolated on its own cement pad.

Figure 3:
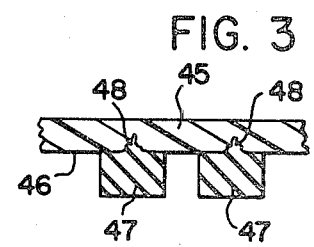
FIG. 3 is a fragmentary cross-sectional view of a modified form of a vibration isolation pad.

A modified form of the vibration isolation pad is shown in FIG. 3 wherein the upper layer is a rigid or outer layer of ultra-high molecular weight polyethylene 45. Integrally attached as by bonding to the bottom surface 46 of layer 45 are a plurality of laterally and longitudinally spaced cylindrical elastomeric plugs or projections 47. The elastomeric projections 47 are similar in composition to the second layer 12 or the projections 13 of the first embodiment. The projections 13 during their molding or bonding to the first layer 12 may employ a flow of the elastomer as at 48 in FIG. 3 to achieve a better bonding therebetween.

Various modifications are contemplated and may obviously be resorted to by those skilled in the art without departing from the described invention, as hereinafter defined by the appended claims, as only a preferred embodiment thereof has been disclosed.

I claim:

1. A pad for isolating the vibrations of a machine having an upper layer of ultra-high molecular weight polyethelene, a lower layer of elastomer secured to the lower surface of said upper layer, and a plurality of laterally and longitudinally spaced elastomeric projections molded to the lower surface of said lower layer to provide vibration isolation to materials loaded on said pad.

2. A pad for isolating the vibrations of a machine as set forth in claim 1 wherein said elastomeric projections are cylindrical rubber discs.

3. A pad for isolating the vibrations of a machine as set forth in claim 2 wherein said molded elastomer projections are thicker than said upper layer of ultra-high molecular weight polyethelene.

4. A pad for isolating vibrations, said pad having an upper layer of ultra-high molecular weight polyethylene, said layer of polyethylene having an upper surface and a lower surface, a plurality of laterally and longitudinally spaced elastomeric projections bonded to said lower surface of said upper layer to provide means for attenuation of vibration.

5. A pad for isolating vibrations as set forth in claim 4 wherein said projections have portions thereof extending into said upper layer to provide a firm bonding thereto.

* * * * *